Dec. 29, 1925.  
J. M. W. KITCHEN  
APPARATUS FOR TREATING LACTIC FLUIDS  
Filed June 2, 1923    3 Sheets-Sheet 3

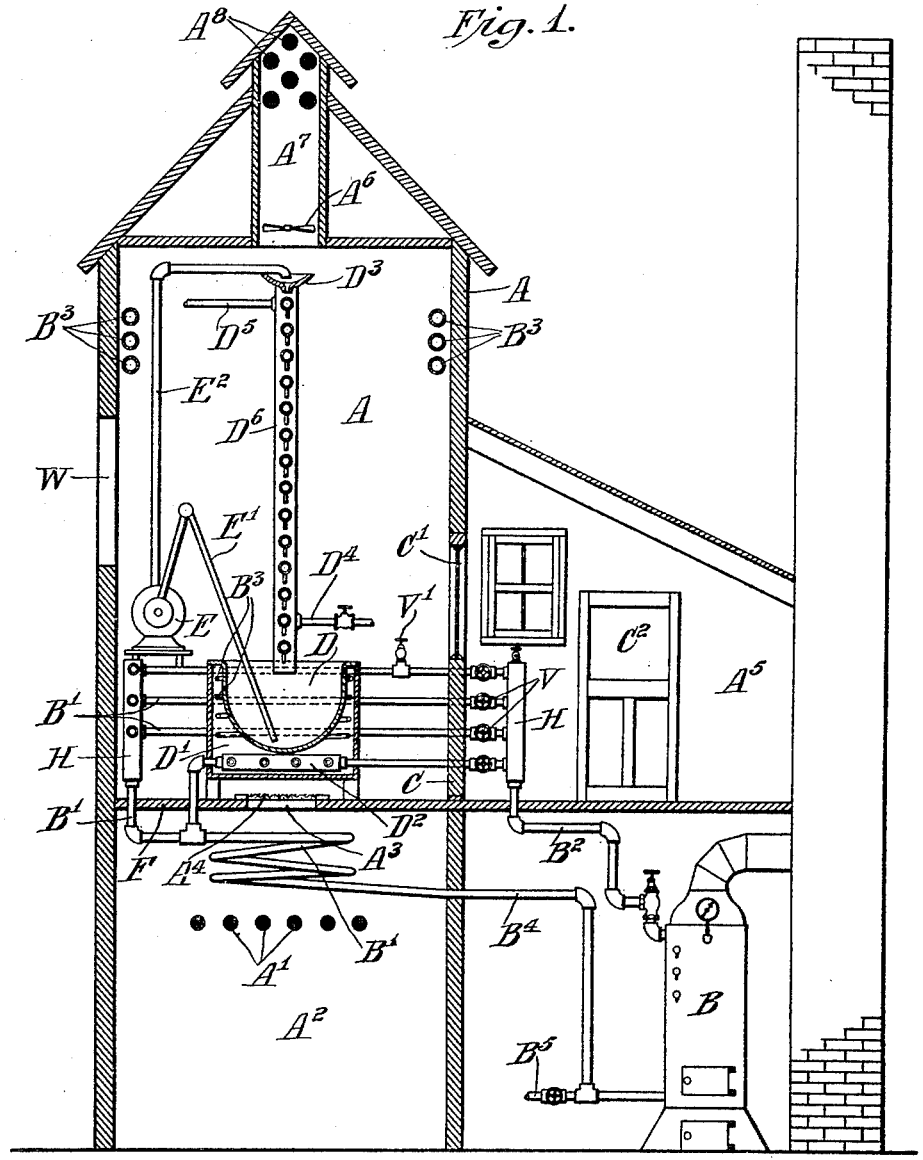

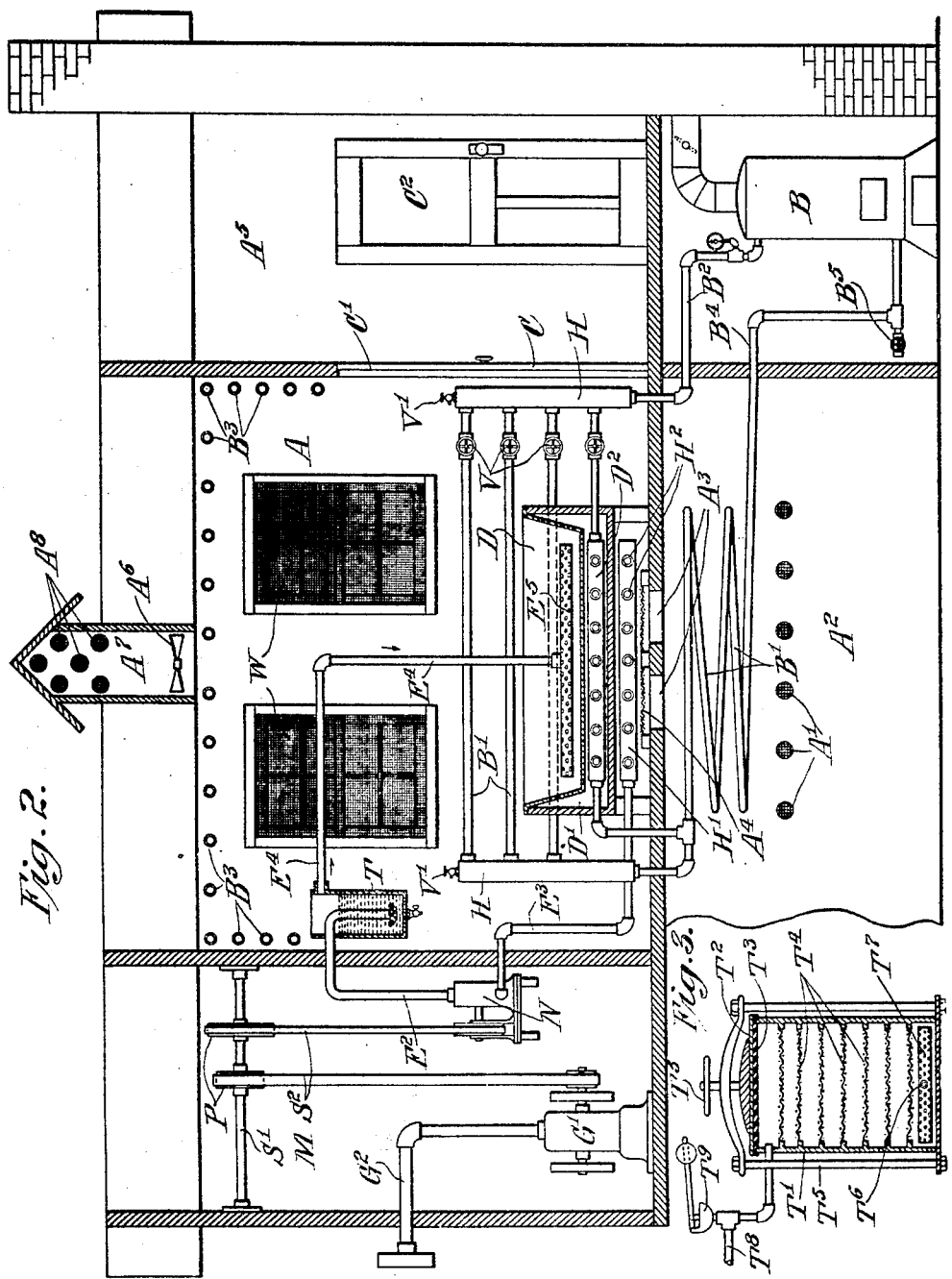

1,567,274

INVENTOR  
Joseph Moss Ward Kitchen

Patented Dec. 29, 1925.

1,567,274

UNITED STATES PATENT OFFICE.

JOSEPH MOSES WARD KITCHEN, OF EAST ORANGE, NEW JERSEY.

APPARATUS FOR TREATING LACTIC FLUIDS.

Application filed June 2, 1923. Serial No. 643,022.

*To all whom it may concern:*

Be it known that I, JOSEPH MOSES WARD KITCHEN, a citizen of the United States, residing in the city of East Orange, county of Essex, and State of New Jersey, have invented new Apparatus for Treating Lactic Fluids, of which the following is a specification.

The objects of the invention, which is an advance on my previous inventions, are to overcome certain defects in the character of market milk, cream and butter that widely exist in those products, and to so reduce the cost of treating such foods as to enable them to be sold at prices within the reach of the masses.

The defects I overcome in applying the present invention are as follows:

1. The formation and accumulation in milk, cream and butter, of excretory products of milk borne bacteria due to fermentative increases in the bacterial infections that always more or less occur in the production of milk, and which usually largely occur.

2. Degradation in the nutritive character of milk, cream and butter, because of the decomposition changes in the food constituents of those products due to the vital activities of the infecting bacteria in changing the nutritive elements of those lactic products.

3. Contaminations due to the absorption of volatile diffusive putrefactive matters derived from the cow's body and the barn atmosphere; and those evolved in milk and cream by milk borne bacteria, all of which matters are at least unwholesome and offensive to taste and smell.

4. Degenerative changes which occur in butter due to oxidation and other chemical changes, especially if excess acid and putrid products have been formed in cream prior to its churning.

5. The formation of the decomposition toxic products in milk, cream and butter known as protein split poisons, which result from the death of or destruction of bacteria from senility, pasteurization or other cause.

I overcome such defects by:

1st. A special temperature control of lactic fluids, commencing before they lose their self-protective power, and by maintaining that control with substantial continuity from the time of production of milk up to the time of the delivery to the consumer of the lactic product in any of its forms.

2nd. By complete elimination from lactic fluids of volatile diffusive contaminations, such elimination being effected before, during or after pasteurization as consecutive or coincident processes.

3rd. Pasteurizing and cooling the fluids thru the aid of the apparatus herein described and claimed.

4th. Consecutive or coincident aeration, pasteurization and cooling of lactic fluids in a germ-free atmosphere with the aid of the specific means herein described and claimed.

5th. Thru the combined procedures of artificial anti-fermentative cooling of milk or cream before they have lost their self-preservative character, followed by consecutive aeration, pasteurization, churning, molding the derived butter in special sized and formed prints, protectively enwrapping the prints, boxing, chilling, transporting the prints, and cold storing the prints under non-fermentative temperature influence; and finally sub-divisionally printing the butter immediately prior to distributing the butter to consumers.

These connected chains of step-procedures prevent incubation of the primary infections of the milk which always more or less occur; and also prevent the occurrence of new infections of the lactic fluids and manufactured butter at any stage of the treatment of the fluids and the manufactured product, up to the time of delivery to the consumer.

6th. By aerating and pasteurizing milk before fermentation begins in it, and after separating cream from the milk, controlling the temperature of the cream at a specified temperature that substantially prevents putrefactive fermentation in the cream of undestroyed putrefactive bacteria in the cream at any time during its holding before the churning of the cream; and finally, holding the butter at such low degrees of temperature as will substantially prevent fermentation occurring in the butter at any time prior to the delivery of the butter to the consumer. In the prior art it has been the practice to pack butter in tubs at the butter making plant, and to hold the tubs in cold storage, and form the tubbed butter into prints at city printing plants. In my method of forming the butter into large prints of square form at the churning plant immediately after the churning of the butter and while it is still soft, and of such size as will chill quickly, wrapping the prints, packing the prints in close juxtaposition in square packing boxes; and by retaining the butter in this convenient form until distributed to quickly soften and then subdividing them into smaller prints or butter pats at the distributing plant, I avoid such increased infections of the butter as usually occur during the delay consequent to a greater time being required to sufficiently chill tub-full amounts of butter at the churning plant, and during exposure of the butter to new aerial infections while holding the butter in a softening atmosphere after its long cold storage and removal from the tub until it becomes sufficiently soft to put into final print form; under which conditions the butter not only is subjected to new aerial infections, but also to absorption of fumes such as are present in city atmospheres. Those contaminations I largely avoid in my method.

Pre-fermentative control of temperatures of milk before it is pasteurized, is not fully practiced in the prior art. It is old to pasteurize part of the milk produced by the milk farmer before the milk is greatly fermented; but the pasteurization of milk is effected of mixed relatively non-fermented and partly fermented milks, with the result that the pasteurized mixed milk contains some excretory products of fermentation, and some protein split decomposition products resulting from the destroyed bacteria that have become introduced in or newly incubated in the milk before it is pasteurized. I practically overcome this defect by immersing the containers of lactic fluids, either milk or cream, in iced water during the usual twelve hours of waiting until the fluids that are produced evenings and mornings are coincidently or consecutively aerated and pasteurized. In this way, incubation of infections are so slight as to be negligible. In the older art, milk in its moderate cooling becomes partly aerated, but it coincidently becomes atmospherically infected during its cooling and aeration. In my method I secure full aeration of either milk or cream without infecting the milk or cream during their treatment. The apparatus I have invented, secures in dairy products such absolute sanitary certainty in its freedom from excretory and decomposition products as has not hitherto pertained to such food products, and such results are secured with a lessened damage to the edible excellence of those foods at a lowered cost per degree of excellence, than has previously been secured.

Applied features of the invention comprise the utilization of the force of gravity in indirectly securing an upward flow of an aerating atmosphere thru the apparatus I use, and provide for the entrance of air of the greatest purity at the lowest levels of the apparatus, and the exit of diffused fume contaminations of the lactic fluids treated, at the highest level of the apparatus and its dilution at that high level with wind-wafted air that carries the fumes away from the apparatus. The use of pure air in aerating lactic fluids is an important matter. I apply the principle of preventing the direct contact of lactic fluids with the source of heat or frigidity used in my process by an interposed atmosphere of the required temperature that is directly transferred to the fluid being treated. I apply the principle of effecting temperature control of the directly acting atmosphere, by sectional control of heating and cooling piping heated by steam or hot water or cooled by refrigerating brine. I apply the principle of the vertical countercurrent transfer of heat, thru the application of which principle economy in the use of fuel is effected.

The apparatus I use to meet variations of physical character in the fluids treated as to their related fluidity varies during their treatment and changes in atmospheric temperatures. For example, whole milk or thin cream can be pumped in rotary or reciprocating pumps without much damage to them; but cream having a lessened fluidity becomes damaged in its character as to being exhaustively churnable, if it is pumped. To meet that condition, I may use in moderate sized churning plants, the special device indicated in Figs. 4 and 5 in the accompanying drawings; while in large churning plants the aerating apparatus shown in Figs. 2 and 3 may be more efficiently used; in which I use a large volume air blower, and an air conditioner. The general principles applied in the invention, are applied in all of the several modifications herein shown to meet the special varying conditions present.

The apparatus comprises in its refrigerative piping means for condensing thereon fume contaminated moisture derived from the fluids being aerated.

The accompanying drawings indicate the various required embodiments of those parts of my invention in which lactic fluids are aerated, pasteurized and cooled in consecutive, or coincident steps. In the drawings, Fig. 1 represents in vertical cross section a plant for the carrying out of aeration, pasteurization and cooling milk or thin warm cream.

Fig. 2 represents a plant for aerating, pasteurizing and cooling thick cream in large creameries.

Fig. 3 represents an air conditioner which I may use for purifying air if the air is forcedly compressed in aerating cream.

Figure 4:
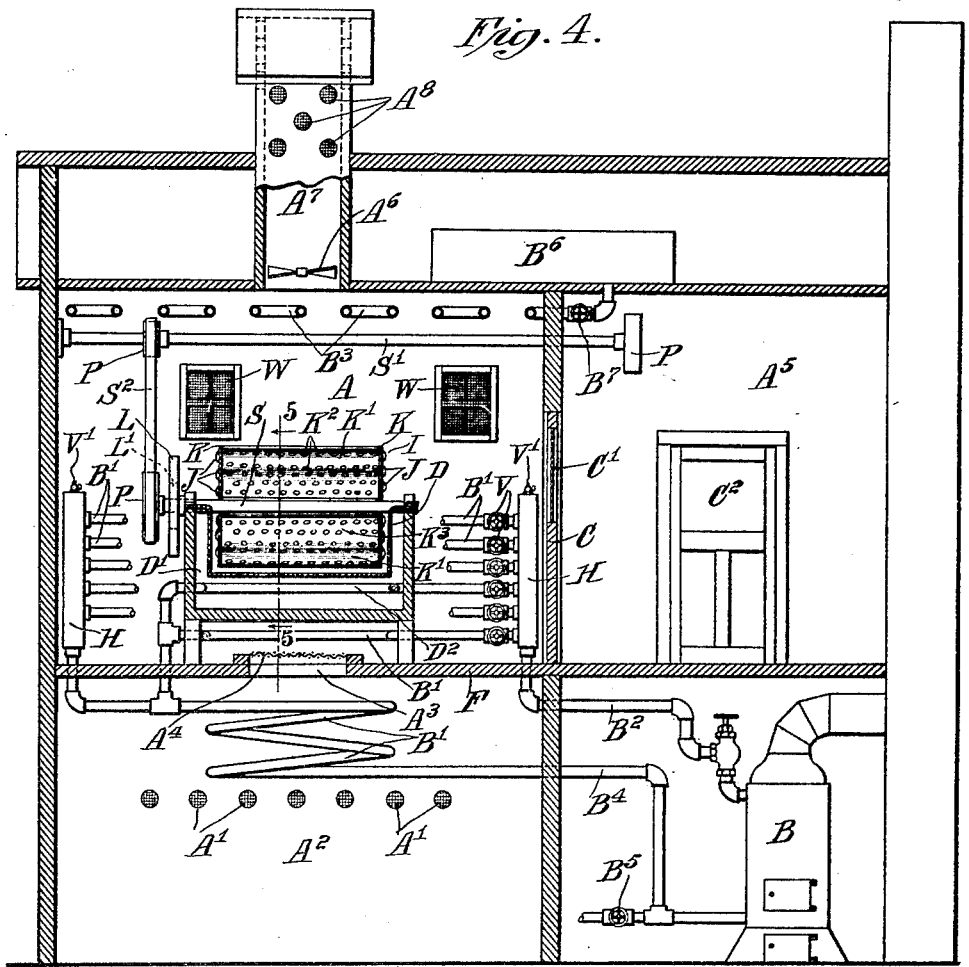
Fig. 4 represents in vertical cross section an embodiment of my invention suitable for aerating, pasteurizing and cooling thick cream, especially cream that is to be made into butter.

In all of the drawings, A is a combined aerating and pasteurizing apartment. $A^1$ are screened air admitting apertures. $A^2$ is a space underneath the apartment A. $A^3$ is an air aperture thru the floor F. $A^4$ is a dust and bacteria screen. $A^6$ is an exhaust fan. $A^7$ is an exhaust air and fume conduit. $A^8$ are insect screened exhaust air and moist fume exits. B is a steam boiler. $B^2$ is a steam main leading to the steam header H with which are connected steam pipes $B^1$ and the jacket heater $D^2$, all of which are controlled by the steam valves V. $V^1$ are air valves. $B^3$ are refrigerating pipes. $B^4$ is a return main carrying condensed steam to the boiler B. $B^5$ is a water draw-off for the boiler and heating system. C is an entrance door to the apartment A. $C^1$ is a glass window thru which a view of the apartment A can be had from the vestibule $A^5$ which is entered by the door $C^2$. In all cases, the control of the temperature in the apartment A is effected from without the apartment A. W, W are windows which may be used in cleaning the apartment A. D is a cream vat of which $D^1$ is the heating and cooling jacket according as steam or refrigerating fluid is introduced into the jacket thru the pipes $D^2$ or $B^3$. E is a rotary pump which draws fluid from the vat D thru the pipe $E^1$ and forces it up thru the pipe $E^2$ into the trough $D^3$ from which the fluid is distributed in a continuous circulatory film over the cooler and aerator $D^6$, the temperature of which may be partly controlled by running a warm or cold fluid from below upwardly thru the aerator, the fluid entering thru the inlet $D^4$ and finding exit thru the outlet $D^5$. As the fluid gravitates downward over the aerator $D^6$, a heat transfer is effected in the fluid in a vertical countercurrent heat transfer. The fluid is heated by hot vapor produced by heating water in the jacket $D^1$, and also by contact with hot fresh air that first enters the space $A^2$ thru the screened apertures $A^1$ and is carried upwardly thru the aperture $A^3$ and the screen $A^4$, being preheated by the condensed steam running thru the coil $B^1$ in the space $A^2$, and by other coils $B^1$ in the apartment A, thru which the air rises under the upwardly forcing influence of the weight of the external colder air; and if necessary, is mechanically exhausted by the fan $A^6$ and forced thru the exhaust conduit $A^7$ and screened apertures $A^8$.

The fluid in its heating is not brought into direct contact with heating surfaces of higher temperatures than are necessary to bring the temperature of the fluid to a pasteurizing degree, thru a longer than usual heating. The fluid is run circuitously over the aerator $D^6$, until all volatile diffusive matters of an offensive nature are eliminated from the fluid, and it has been maintained at a pasteurizing temperature for a sufficient length of time to secure the destruction in it of pathogenic germs. After its pasteurization, the steam in the heating appartus is shut off at the boiler B, and cold well-water is forced upwardly thru the aerator $D^6$, and refrigerating brine is circulated in the pipes $B^3$ in order to secure as quick cooling of the fluid as is possible. Loss of water in milk is made good by addition of sterilized water. If the fluid is bottled before its cooling, it is preferably given a final heating after its bottling, in a specially provided oven; and afterwards in the same place, is then cooled thru mechanical refrigeration, to a temperature as near to the freezing point as is practical without freezing the fluid.

In Fig. 2 the apparatus shown is intended for the aeration and pasteurization of cream for butter making in large churning plants. Cream, besides being usually more thick and difficult to run over an aerator in a thin film, may be damaged in its exhaustive churnability by the operation of the ordinary rotary pumps used in pumping milk. Hence on that account, air is bubbled thru the cream, being forced by a mechanically motored air compressor, the air being first forced thru an air purifying conditioner before being forced thru the cream, so that the cream is not contaminated by aerial infections or gaseous contaminations in the air.

In Fig. 2, besides the characters representing similar parts in Fig. 1, M represents an apartment adjoining the aerating apartment A, which contains the gas engine $G^1$ that exhausts its gases thru the conduit $G^2$. P represents a pulley, $S^1$ a counter-shaft and $S^2$ belting. N represents an air compressor and blower. $H^1$ represents a device into which filtered air is indrawn thru the openings $H^2$ into the compressor N, which forces the air thru a conditioner T of ordinary type, the conduit $E^4$ and the air distributor $E^5$. The apparatus when working is always forcing the warmed fresh air into the apartment A, that when cool first enters the space $A^2$ thru the apertures $A^1$; and is exhausted from the apartment A thru the exits $A^8$ with or without action of the fan $A^6$.

Fig. 3 represents a specific form of air conditioner $T^1$, which has a cover $T^2$ having a gasket $T^3$. The cover $T^2$ when removed from the conditioner, allows of the dry screens $T^4$, which are of a character that mechanically intercept dust and bacteria, being removed from the interior of the conditioner T¹ and being replaced by new sterile screening material. T⁵ is a compression device by which the lid T² is compressed onto the top of the conditioner T¹. Forced air enters the apparatus at T⁶ and is distributed by T⁷, and finds exit thru T⁸; T⁹ is a pressure valve, thru the manipulation of which, the pressure of the air forced downwardly into and thru the cream vat D, is regulated.

Fig. 4 represents the invention specially intended to use in plants of moderate size, for aerating, pasteurizing and cooling cream. Besides the characters hitherto named, in Fig. 4, B⁶ represents a brine tank from which refrigerating fluid is drawn and circulated thru the pipes B³, the circulation being controlled by the valve B⁷.

In this special aerating device, I is a rotary aerator and mixer of which K, K are the disk ends of the rotor. J are openings for the indrawing of cream thru the ends K, K. The rotor I is operated by power transmitted from the pulley P and the counter-shaft S¹, thru the belt S². In the rotation of the rotor I, the cream is lifted above the general level of the fluid at one side of the vat in the perforated dipper parts K¹ of the blades K³, and is gravitated thru many openings K², and downwardly over the blades K³ and the lips K⁴. The lips K⁴ are for strengthening the edges of the aprons which form a part of the blades K³. As the aprons of the blades K³ rise and rotate, the cream runs downward over the aprons towards the central shaft S, to the level of the cream in the vat. When the convexities of the dippers K¹ reach the level of the cream at the other side of the vat, air in the dippers K¹ is carried down below the level of the cream at the other side of the vat, and air bubbles up thru the cream thru the perforations K². The small gear wheel L¹ which is revolved by the shaft L², slowly revolves the large gear wheel L, without churning the cream in the revolution of the device, the whole bulk of the fluid in the vat D is kept mixed, including the cream that is indrawn thru the pockets J. The rotor I use may be revolved by hand.

This invention comprises the idea of aerating and pasteurizing milk before separating cream from the milk, then separating the cream and cooling it to a churning temperature, and then making butter from the cream. This method overcomes the difficulty of aerating cream after its separation without churning the cream during its aeration, for the milk while in its normal condition of fluidity can be conveniently pumped with an ordinary rotary pump in an adequate number of circulatory pumpings in contact with air that absorbs volatile diffusive matters from the milk, and without damage to the churnability of the cream.

Figure 5:
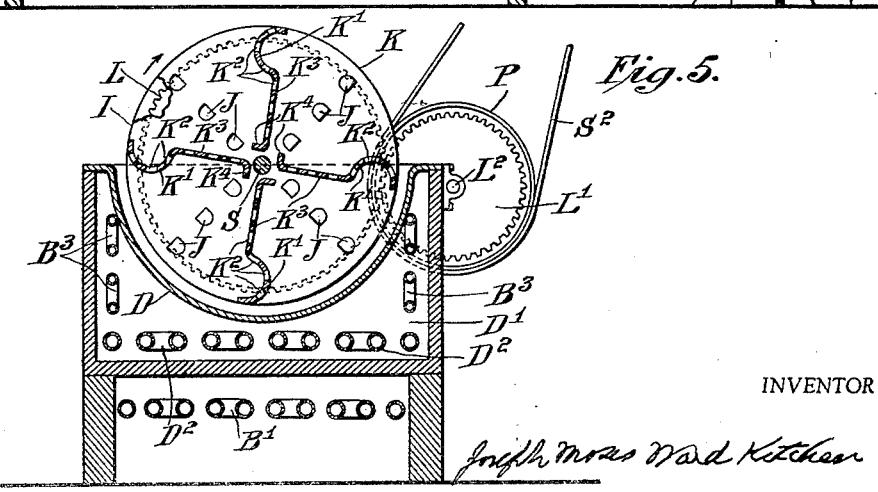
Fig. 5 represents in larger size, a vertical section of the device shown in Fig. 4, taken on the line 5—5 of Fig. 4.

The several devices shown in the drawing are recommended for use in plants of various sizes and for various purposes. That shown in Fig. 1, is for treating market milk in large quantities, in which the milk can be circuitously pumped by a rotary pump. That shown in Fig. 2, is for treating cream in large quantities; and that shown in Figs. 4 and 5 is for specially treating cream in small quantities, without damaging the churnability of the cream. The latter device can be conveniently used for treating milk, as well as cream, in communities of so small a size that pasteurizing plants are usually not erected.

My invention secures absolute sanitary certainty in butter as well as edible excellence both as to taste and smell; and also leaves skim milk as a by-product, in a superior condition to prepare thru drying or by other methods, skim-milk products of unusually high hygienic character.

This invention comprises the idea of separating cream at the farm, holding the separated cream at an ice-water temperature, delivering the cream to the butter making plant at approximately an ice-water temperature, and consecutively aerating, pasteurizing and cooling the cream to a churning temperature, churning the cream, printing the cream in prints of a selected large size of square form, for cold storage, double wrapping the prints and packing the prints in square shipping and storing cases, chilling the packed prints at the butter making plant before shipping the butter to cold storage plants, holding the butter in a nonfermentative temperature in a dry atmosphere, and subdivisional printing and distributing the butter equably thruout the year to consumers. This plan provides for the successful low cost production of butter from summer pasturage, and secures an advanced price to the farmer for his cream product. This principle of deep prepasteurizing refrigeration, I also apply in treating milk in overcoming a serious defect in practice, which is that of holding some of the milk for about the first one-half of each twenty-four hours at incubating well water or higher temperatures, and then admixing the held fermented milk with a subsequent milking before pasteurizing the admixed two milkings. To practically overcome that defect in practice, I immerse the containers of the first produced milk, in iced water of a temperature of about 40° F. until delivery is made of all the milk drawn in each twenty-four hours. This practice overcomes the incubative formation of the bacterial content usually found in market milk part of which has been held for six or more hours before its pasteurization.

It will be understood that I may use all the apparatus herein described in a progressive series of steps to meet special conditions effecting the character of fluidity in the fluid under treatment.

Notice is here given that subject matter is herein disclosed that is not claimed herein, but which is claimed in my copending applications Ser. Nos. 605,272; 605,273; and 626,115.

What I claim as new is:

1. In an apparatus of the class described, a rotor comprising a rotatable shaft, means for rotating said shaft, a plurality of blades rotated by said shaft, said blades being provided with perforated dippers.

2. In an apparatus of the class described, a rotor comprising a rotatable shaft, means for rotating said shaft, a pair of spaced disks secured to said shaft, elongated blades connecting said disks, said blades being radially disposed to said shaft, the outer portion of said blades being provided with concavo-convex perforated dippers.

3. In an apparatus of the class described, a rotor comprising a rotatable shaft, means for rotating said shaft, spaced perforated disks secured to said shaft, perforated blades connecting said disks, said blades being radially disposed to said shaft, the outer portion of said blades forming perforated elongated trough-dippers, and the inner longitudinal edges of said blades being spaced from the shaft.

JOSEPH MOSES WARD KITCHEN.